Sept. 29, 1936. A. JOSEPHS 2,055,930
DUSTPROOF TELESCOPIC AUTOMOTIVE TRAILER
Filed April 7, 1934 2 Sheets-Sheet 1

INVENTOR.
Albert Josephs
BY
Philip A. Friedell
ATTORNEYS.

Sept. 29, 1936.  A. JOSEPHS  2,055,930
DUSTPROOF TELESCOPIC AUTOMOTIVE TRAILER
Filed April 7, 1934  2 Sheets-Sheet 2

INVENTOR.
Albert Josephs
BY
ATTORNEYS.

Patented Sept. 29, 1936

2,055,930

UNITED STATES PATENT OFFICE 2,055,930

DUSTPROOF TELESCOPIC AUTOMOTIVE TRAILER

Albert Josephs, Oakland, Calif.

Application April 7, 1934, Serial No. 719,445

2 Claims. (Cl. 296—23)

This invention is a dust-proof, self-reinforcing, telescopic automotive trailer in which the associated elements cooperate in such manner as to seal the interior of the trailer against ingress of dust whether the upper section of the trailer is raised for camping or lowered for traveling, and in which the upper and lower sections lock together to combine the reinforcement of both sections when the upper section is in its raised or camping position, and in which the raising and lowering means for the upper section is self-compensating for variation in effective length of the various elements comprising the means.

Automotive trailers of the telescopic type permit ingress of dust to the interior of the trailer due to several reasons, of which, in one case, the trailer may admit dust either in the raised or lowered position or both, due to the omission of sealing means, and in another case, the raising and lowering means are not self-compensating for variation in the length of the flexible elements cooperating with the different portions of the upper section, so that, while contact may be obtained at certain points, such contact is lacking in continuity, and if any slight crack exists, dust will readily enter or filter through while the trailer is being towed behind an automotive vehicle on a dusty road.

This invention, in addition to providing sealing means entirely about the trailer in both raised and lowered positions of the upper section, incorporates raising means which is self-retaining and self-equalizing, thereby compensating for variations in length of the various cables associated therewith, thus causing every portion of the sealing means to be completely effective.

The self-retaining features of the raising means prevent retrograde movement of the raising means and the perfect seal is maintained so long as the adjusting means is not tampered with and actually operated.

The main object of the invention therefore, is to provide a telescopic trailer with sealing means to seal the interior of the trailer against ingress of dust in both, the raised and lowered positions of the upper section.

Another object of the invention is to provide encompassing interlocking means between the upper and lower sections when the upper section is in its raised position, for combining the reinforcement of the upper and lower sections, so that hammock beds will be effectively supported across the top of the lower section.

A further object of the invention is to provide raising and lowering means for the upper section which is self-retaining and self-equalizing to compensate for variations in effective length of cables or flexible elements used, so as to cause uniform cooperation of the sections with the sealing means to make the sealing means completely effective.

Other objects and advantages of the invention will become apparent as the following description is read on the drawings forming a part of this specification and in which similar reference characters are used to indicate similar parts throughout the several views of which;

Figure 2:
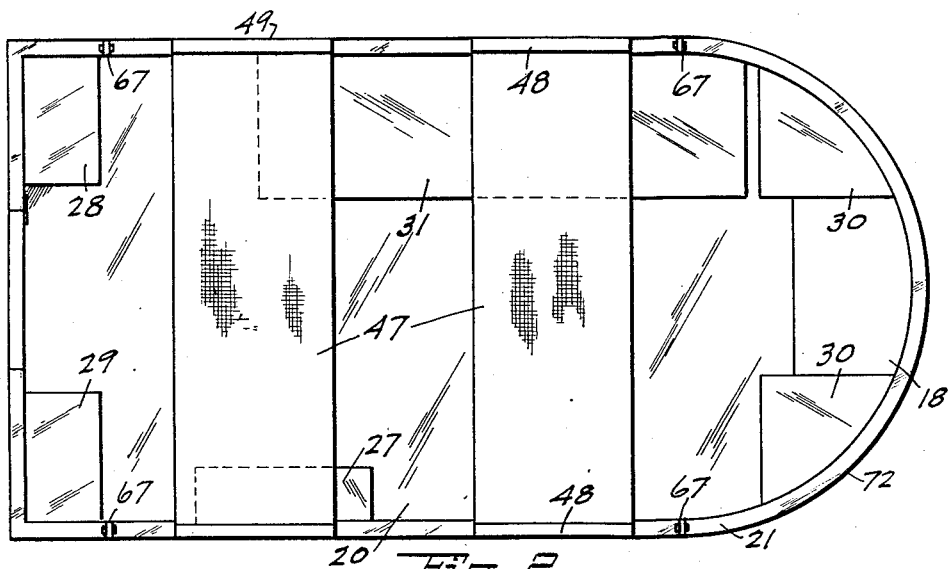
Fig. 2 is a plan view of the lower section of the trailer.
Figure 3:
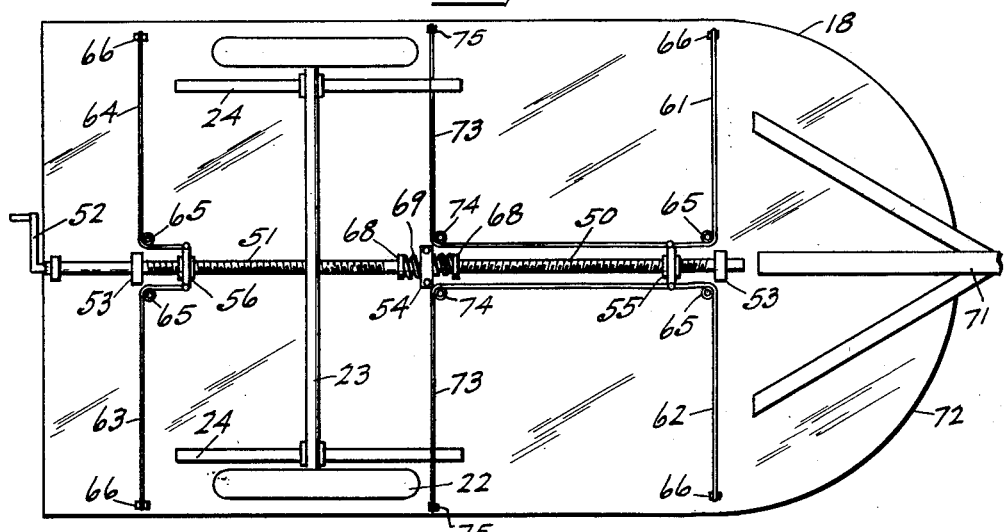
Fig. 3 is a bottom view of the lower section of the trailer, showing the self-retaining, self-equalizing features of the invention.
Figure 1:
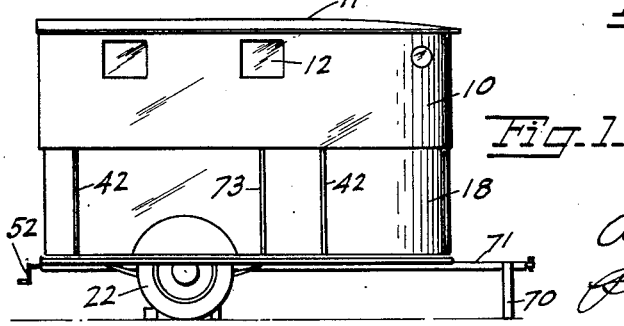
Fig. 1 is a reduced side elevation of the invention.
Figure 4:
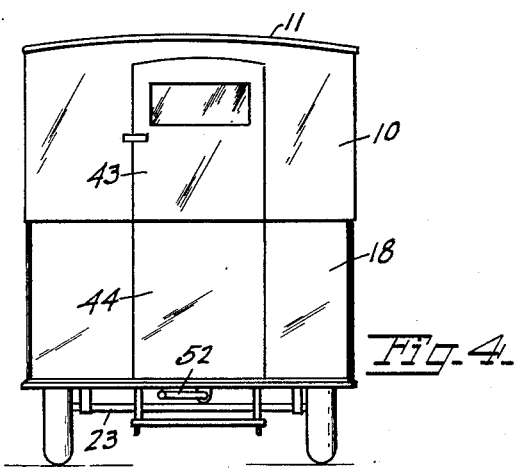
Fig. 4 is a rear view of the invention on a somewhat reduced scale.
Figure 6:
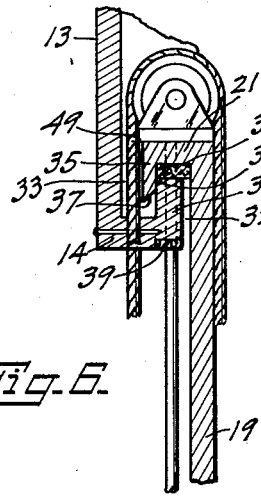
Fig. 6 is an enlarged fragmentary section through the wall of the trailer showing the sealing means, locking means and guiding means.
Figure 5:
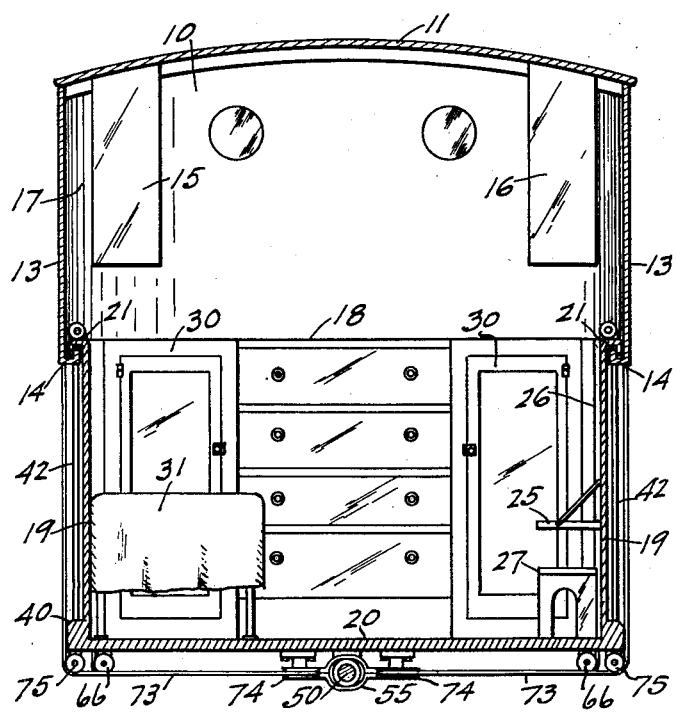
Fig. 5 is a transverse sectional elevation through the invention.
Figure 7:
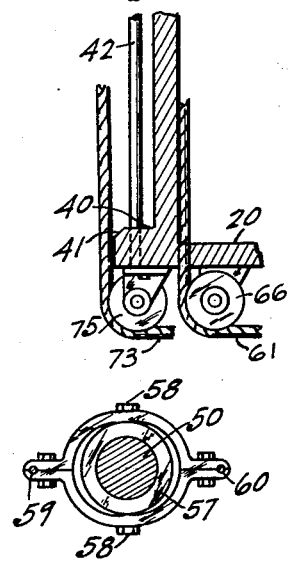
Fig. 7 is an enlarged elevation of the swivel collar and nut.

The invention consists of an upper section 10 having a roof 11, windows 12 and walls 13, the lower ends of the walls 13 terminating in one element of the interlocking element indicated at 14. Suspended from the roof are two cabinets 15 and 16 which are spaced from the walls a sufficient distance to clear the walls of the lower section as indicated at 17.

The lower section 18 consists of walls 19 and floor 20, the upper end of the walls terminating in the other element of the locking means indicated at 21. The lower section is mounted on road wheels 22 which are rotatable on the axle 23, springs 24 acting between the bottom of the trailer and the axle.

A folding table 25 folds flat against the inside of the wall 19 between two studs 26, which act as retaining elements against longitudinal movement, the table being suspended intermediate its width by cables.

A bench 27 is adjustable to two positions, one against the wall and the other in seating relation to the table. Ice box 28, kitchen cabinet 29 on which a stove (not shown) is mounted, and linen cabinets 30 are also provided, as also an extensible couch 31.

The interlocking means or elements consist of encompassing flange portions 14 and 21, each of which clears the wall as indicated at 32 and 33 and which flanges terminate respectively in upturned and downturned encompassing portions 34 and 35, the cooperating leading edges of which are beveled as indicated at 36 and 37 to prevent the edges from obstructing each other. As will be noted, the vertical cooperating faces combine the reinforcement of the two sections and the interlocking elements of the two sections are complemetarily formed.

The sealing means for the raised position of the upper section consists of a pad 38 of felt or other resilient material mounted in the groove formed between the wall 19 and element 35, the pad cooperating with the top edge of element 34 to provide a seal against ingress of dust.

The sealing means for the lowered position of the upper section consists of a pad 39 of felt or other resilient material which rests on the encompassing rail 40 which is beveled as at 41 to shed dirt and dust, whereby the interior of the trailer is sealed against dust when the upper section is in its lowered position.

Guiding means consists of rods 42 slidable in holes formed in the element 34 and fixed in the elements 21 and 40 and which retain the element 34 out of contact with walls 19 thus obviating scratching and marring of the paint on the walls 19 and coincidently guide the vertical cooperating faces of the upturned flanges in co-operative alignment.

Figure 8:
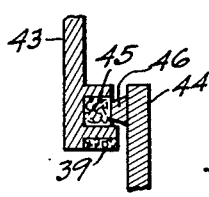
Fig. 8 is an enlarged fragmentary section showing the door seal.

The upper section is provided with an outwardly swinging door 43 and the lower section with an inwardly swinging door 44, both of which are provided with cooperative sealing means as indicated in Fig. 8, in which a resilient pad 45 cooperates with a bead 46.

The hammock beds consist of a flexible mat, 47 such as canvas, having an angle clip 48 at each end, one leg of which fits over the side 49 and between this side and the inside of the wall 13, thus preventing tilting of the clip, the locking means combining the reinforcement of the walls 13 and 19, and the elements 14, 21, 34 and 35 to effectively support the beds under load.

The self-retaining, self-equalizing raising and lowering means for the upper section consists of a right and left hand screw 50—51, terminating in a hand-operated crank 52 and rotatably and slidably mounted in bearings 53 and 54, which are mounted on the bottom of the trailer. A swivel collar 55 and 56 are mounted on suitably threaded nuts 57 which are provided with swivel pins 58, the collars coincidently forming a clamp for the cables as indicated at 59 and 60 and being formed in two halves bolted together.

The cables 61 to 64 have one of their ends secured to the swivel collar and their other end to the respective end portions of the upper section in the member 14, passing about interposed pulleys 65, 66 and 67, raising the upper section by the four corners.

A collar 68 is fixed on screw shaft 50—51 in spaced relation to each end of the bearing 54 and a spring 69 under compression is interposed between the collar and its respective end of the bearing.

Cables 73 are attached to the under-edge of the top section and draw the top section down as the raising cables are slacked off to lower that section. These cables operate over pulleys 74 and 75, as shown.

It will thus be noted that when the crank 52 is rotated, the collars 55 and 56 travel in opposite directions, drawing on the cables, and as the upper section reaches its uppermost position, if contact with the sealing means is not continuous, the swivel collars 55 and 56 compensate for variations in proper length of cables of the respective pairs 61—62 and 63—64, and the variations between these pairs is compensated for by floating action of the screw shaft against action of the springs 69, and that if the pitch of the screw is not too great, the weight of the upper section can cause no retrograde movement of the screw shaft.

Suitable adjustable jacks 70, and tongue or coupling 71 are provided.

The forward end of the trailer is streamlined as indicated at 72 to cut down wind resistance, break vacuum back of the auto and dispel dust raised by the auto.

It will be understood that variations in construction and arrangement of parts which are consistent with the appended claims may be resorted to without detracting from the spirit or scope of the invention or sacrificing any of the advantages thereof.

I claim:

1. Self-retaining, self-equalizing raising and lowering means for a telescopic trailer comprising a right and left hand screw and means for rotating the screw, a nut for each respective threaded portion, a swivel collar for each nut, and terminals on the collar, a cable for each corner portion of the trailer, the cables having their respective ends secured to the respective corner portions of the upper section of the trailer and to the respective terminals of the collars permitting equalization between the cables attached to each collar, said cables passing about interposed pulleys mounted on the lower section of the trailer, a bearing for the screw, a collar in spaced relation to each end of the bearing and affixed to the screw, resilient means interposed between each collar and said bearing for retaining the screw in intermediate position as related to the bearing to permit floating action of the screw to compensate for variations in length of the cables operating respectively the front and rear portions of the upper section, whereby complete equalization between the cables is effected.

2. In a telescopic automotive trailer, an upper section having side walls and a lower section having side walls, complementary encompassing sealing members formed respectively at the top of the lower section and at the bottom of the upper section, an encompassing ledge at the bottom of the lower section, means maintaining said sealing members in spaced relation to said side walls, and raising and lowering means for said upper section including compensating means providing equalized continuous contact respectively between the sealing members in the raised position of the upper section, and between the sealing member of the upper section and the ledge in the lowered position of the upper section.

ALBERT JOSEPHS.